Patented Feb. 21, 1939

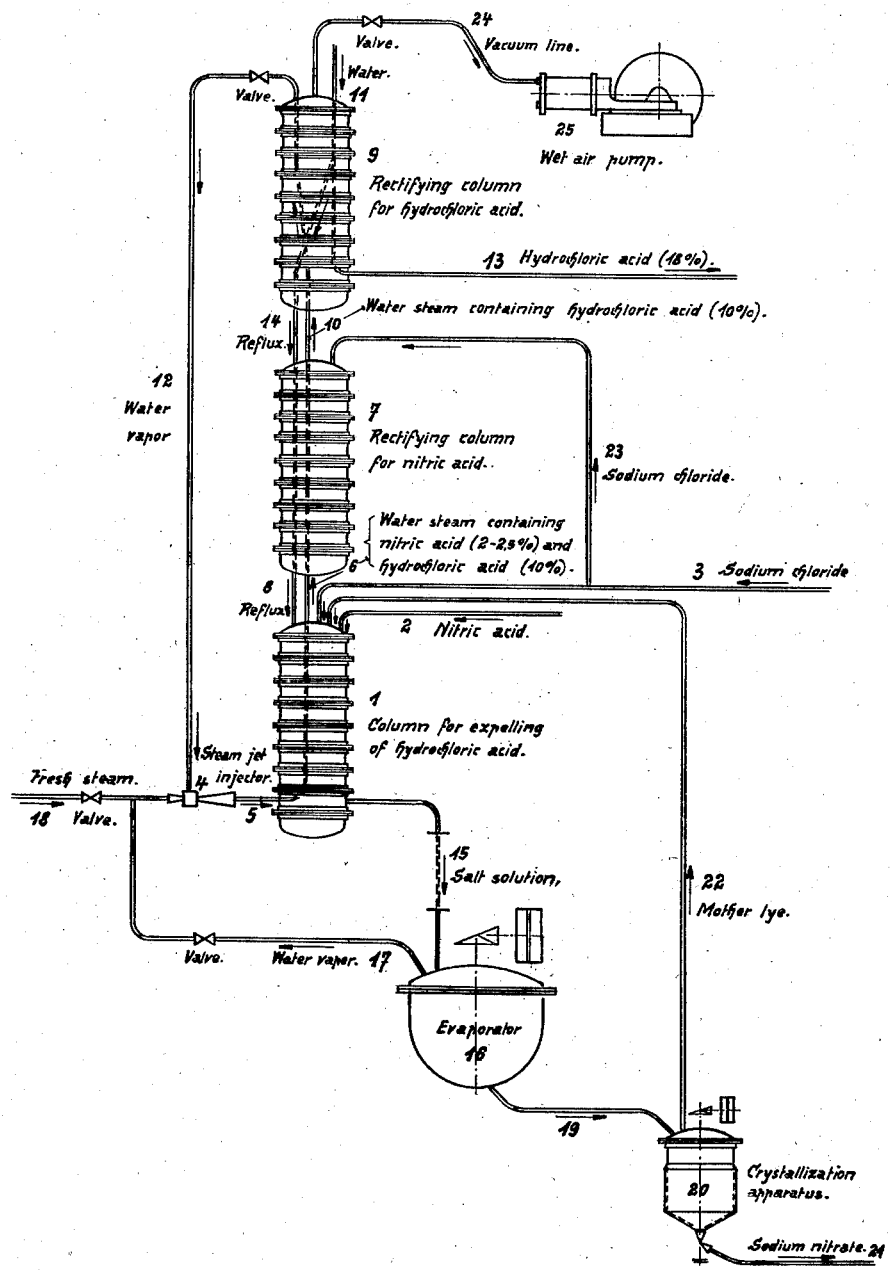

2,147,988

UNITED STATES PATENT OFFICE 2,147,988

PRODUCTION OF ALKALI METAL NITRATES

Harry Pauling, Berlin, Germany

Application January 7, 1936, Serial No. 57,987
In Germany January 2, 1935

5 Claims. (Cl. 23—102)

This invention relates to improvements in the production of alkali metal nitrates.

On making sodium nitrate from sodium chloride and nitric acid there will readily occur losses of nitric acid by the formation of nitrosyl chloride and chlorine. For this reason it has been suggested to stir sodium chloride in aqueous nitric acid and to expel the hydrochloric acid formed by introducing superheated steam into the reaction chamber under reduced pressure. Moreover, the water contained in the reaction mixture is evaporated by means of the superheated steam. In consequence thereof large quantities of steam are required which, owing to the low pressure, occupy large volumes and require also very large apparatus.

An improvement in the manufacture of sodium nitrate from sodium chloride and nitric acid is obtained by allowing steam to act under reduced pressure upon a mixture of sodium chloride and nitric acid of about 40% content according to the countercurrent principle, the steam introduced not serving as a heating medium but only as a diluting medium in order to obviate the formation of nitrosyl chloride and chlorine.

A plant working according to the invention is schematically shown in the drawing.

The aqueous nitric acid and the sodium chloride are introduced by piping 2 and 3 respectively into the apparatus 1 acting on the countercurrent principle. By means of the steam jet injector 4 steam is blown thru line 5 into the lower part of apparatus 1 which is designed as a column.

The working pressure in column 1 is adjusted so that the boiling point of the reaction mixture is about 70° C. By using the steam only as a diluting medium the quantity of the steam required will be extraordinarily reduced. Moreover, the continuous distillation of the hydrochloric acid in an apparatus operated according to the countercurrent principle permits of obtaining the hydrochloric acid in an essentially higher concentration than is possible if the manufacture of sodium nitrate is carried out in single charges, for in the case of working by charges, larger quantities of steam are required for expelling the last portions of hydrochloric acid than at the beginning of the working process. Besides, a comparatively large rectifying plant is necessary for the rectification of the diluted acid vapors.

The mixture escaping out of apparatus 1 thru line 6 and consisting of about from 2 to 2.5% nitric acid and about 10% hydrochloric acid is rectified in the well known way in a second column 7, the vapors thereby being freed from nitric acid, which flows back thru line 8 into column 1. The remaining vapors consist of water steam with a content of about 10% hydrochloric acid. If also these vapors escaping from column 7 thru line 10 are rectified in a third column 9 by allowing water to flow in thru line 11, hydrochloric acid of about 18% content and pure steam will be obtained, the latter being led out thru line 12, whereas the hydrochloric acid leaves the rectifying column thru pipe 13. Part of the condensate flows back thru pipe 14 into rectification column 7 in order to condense the nitric acid vapors.

The salt solution obtained which is practically free from sodium chloride flows into an evaporator 16 from column 1 thru line 15.

The water vapors escaping from the evaporator are used to expel the hydrochloric acid, which presents no difficulty, as the distillation of the hydrochloric acid takes place under much reduced pressure. With this end in view the evaporator 16 is connected to the steam jet injector 4 by steam line 17. Owing to the fact that these vapors stream out of an apparatus working under a pressure of at least 1 atmosphere into an apparatus with lower pressure, a Venturi effect will be produced which serves to aspirate the steam leaving column 9 by pipe 12. In this way, the steam is reconducted into the working process in a continuous circulation.

For reconducting the steam from column 9 into column 1, if necessary, fresh steam of a pressure higher than one atmosphere is used in addition to the steam from the evaporator. The fresh steam is admitted by pipe 18. The evaporated salt solution is led thru line 19 into the crystallization apparatus 20 from which the sodium nitrate is led out thru outlet 21, whilst thru pipe 22 the mother lye is returned into the apparatus 1. By regulating the proportions of the concentration it is not difficult to graduate this reflux so that nitric acid stronger than 40% can be led into column 1.

The wet air pump 25 connected to the rectifying column 9 by vacuum line 24 serves for maintaining the necessary vacuum of about 0.1 atmosphere which corresponds to a boiling point of the reaction mixture contained in column 1 of about 60–70° C.

Further, it is possible to admit a reflux from column 9 to column 7 to promote the condensation of nitric acid, and in addition to this a portion of the sodium chloride can be introduced thru pipe 23 into column 7, thereby a preparatory expelling of hydrochloric acid taking place in column 7.

The foregoing process may also be applied to the treatment of other chlorides as for instance potassium chloride, ammonium chloride and calcium chloride.

I claim as my invention:

1. A process for the manufacture of sodium nitrate from sodium chloride and aqueous nitric acid comprising contacting in one zone under a pressure substantially below atmospheric a moving stream of a mixture of aqueous nitric acid and sodium chloride with a counter-moving current of steam to form a solution of sodium nitrate and acid vapors, evaporating said solution in another zone under atmospheric pressure, rectifying the acid vapors in a separate rectifying zone, aspirating the steam from the rectification of the acid vapors by means of the steam escaping from the evaporating zone and returning the whole of the steam mixture into the countercurrent zone.

2. A process for the manufacture of sodium nitrate from sodium chloride and aqueous nitric acid comprising contacting in one zone under a pressure substantially below atmospheric a moving stream of a mixture of aqueous nitric acid and sodium chloride with a counter-moving current of steam to form a solution of sodium nitrate and acid vapors, evaporating said solution in another zone under atmospheric pressure, rectifying the acid vapors in a separate rectifying zone, aspirating the steam from the rectification of the acid vapors by means of the steam escaping from the evaporating zone, and by fresh steam of a pressure higher than one atmosphere and reconducting the whole of the steam mixture into the countercurrent zone.

3. A process as set forth in claim 1 comprising the reconduction into the countercurrent zone of the mother lye obtained on the crystallization of the salt solution.

4. A process as set forth in claim 2 comprising the reconduction into the countercurrent zone of the mother lye obtained on the crystallization of the salt solution.

5. A process for the manufacture of sodium nitrate from sodium chloride and aqueous nitric acid as set forth in claim 1, in which nitric acid vapors obtained from the reaction zone are rectified, and a portion of the sodium chloride is introduced into the rectifying zone for the nitric acid vapors.

HARRY PAULING.